United States Patent [19]

Fritsch

[11] 4,266,446
[45] May 12, 1981

[54] HIGH TORQUE INFINITELY VARIABLE TRACTION DRIVE TRANSMISSION

[75] Inventor: Joseph E. Fritsch, Oak Park, Mich.
[73] Assignee: Massey-Ferguson Inc., Detroit, Mich.
[21] Appl. No.: 27,197
[22] Filed: Apr. 5, 1979
[51] Int. Cl.³ .............................................. F16H 15/50
[52] U.S. Cl. .......................................... 74/796; 74/198
[58] Field of Search ........................... 74/796, 798, 208

[56] References Cited

U.S. PATENT DOCUMENTS

| | | | |
|---|---|---|---|
| 1,771,807 | 7/1930 | Mitchell | 74/796 |
| 2,836,994 | 6/1958 | Weber | 74/796 |
| 2,874,593 | 2/1959 | Legros | 74/796 |
| 2,886,986 | 5/1959 | Kopp | 74/796 |
| 3,023,642 | 3/1962 | Maichen | 74/796 |
| 3,822,610 | 7/1974 | Erban | 74/796 X |

*Primary Examiner*—C. J. Husar
*Assistant Examiner*—Frank McKenzie
*Attorney, Agent, or Firm*—John C. Thompson

[57] ABSTRACT

A high torque infinitely variable traction drive has concentric input and output shafts 22, 24 within portions disposed within a housing 12. A cup shaped input carrier 26 is rotatable with the input shaft and carries a pair of pins 46. Planetary members 54 are journaled on the pins, each of the planetary members in turn driving an output gear 62. The gears 62 are in turn interconnected with gearing 76 rotatable with the output shaft. A traction ring 60 is mounted within the housing 12 coaxial with the output shaft 24. The ring contacts an outer spherical surface 58 of the planetary members 54 to establish the rotational speed of the members. Means 82, 84, 102 are provided to axially shift the traction ring 60 relative to the outer spherical surface 58 of the planetary members whereby the speed of the members may be varied. A power take-off shaft 38 may be disposed within the output shaft 24, one end of the PTO shaft being coupled to the inner end of the input shaft 22. The traction ring 60 and traction surfaces 58 are of approximately the same radius whereby maximum torque can be transmitted from a given tangential force.

23 Claims, 5 Drawing Figures

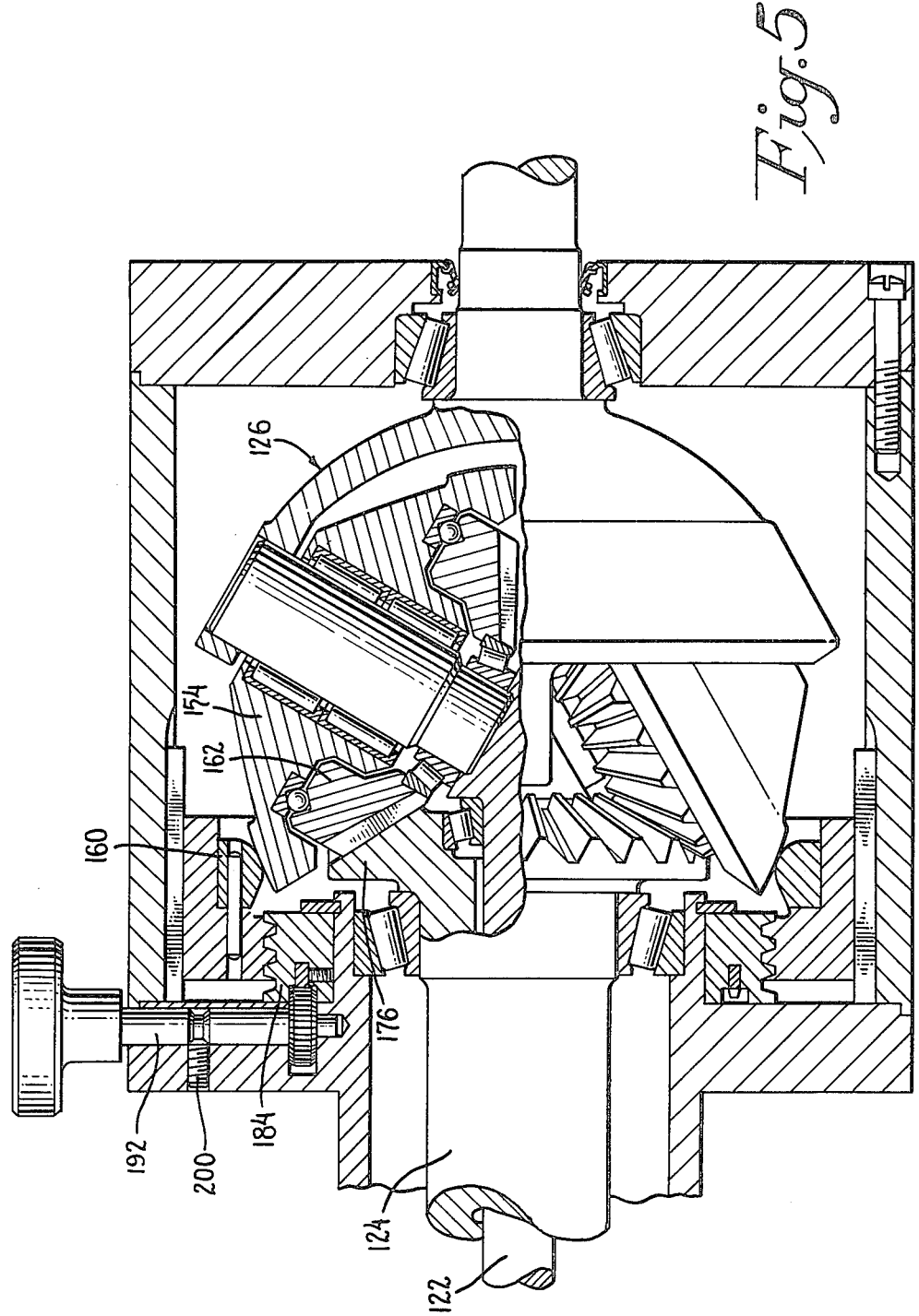

HIGH TORQUE INFINITELY VARIABLE TRACTION DRIVE TRANSMISSION

TECHNICAL FIELD

The present invention relates generally to high torque infinitely variable traction drive transmissions, and more particularly to a dynamically balanced traction drive transmission of the planetary type capable of transmitting high torques.

BACKGROUND ART

Variable speed traction drives of the planetary type are well known. Examples are illustrated in U.S. Pat. No. 3,023,642 issued Mar. 6, 1962, 1,887,505 issued Nov. 15, 1972, 2,109,695 issued Mar. 1, 1938, and 2,836,994 issued June 3, 1958. Another form of traction drive is illustrated in U.S. Pat. No. 2,886,986 issued May 19, 1959. It would appear that the designs of the foregoing patents while generally satisfactory in certain applications would not find widespread use due to their high weight to torque transmitting ratio. Thus, the design of all of the foregoing have relatively small contact areas (or traction surfaces) between the planetary members and the traction ring which contacts the planetary members at varying radial locations to vary the output speed. This factor is primarily due to the wide variation between the diameter of the planetary members and the diameter of the traction ring which contacts the cones.

While the disadvantages set forth above would appear to be overcome in U.S. Pat. No. 1,771,807 issued July 29, 1930 it should be observed that this later design is capable of operating satisfactorily only at relatively low input speeds as it is inherently unbalanced.

DISCLOSURE OF INVENTION

It is an object of the present invention to provide an infinitely variable traction drive transmission of the planetary type which is dynamically balanced and which is capable of transmitting high torques.

More specifically, it is an object of the present invention to provide a transmission of the type set forth above having a traction ring and planetary drive members of approximately the same radius whereby maximum torque can be transmitted from a given tangential force.

Another object of the present invention is to provie a transmission of the type set forth above wherein traction surfaces are used only on the high surface speed, low torque input portion of the transmission, gears being used on the low speed, high torque output portion of the transmission.

The foregoing objects, and other objects and advantages which will become apparent are achieved by providing concentric input and output shafts having end portions extending into a housing, an input carrier rotatable with the input shaft, a plurality of pins whose opposite ends are carried by the input carrier, and planetary members carried by the pins, each of the planetary members in turn driveably supporting an output gear. The gears in turn are interconnected with gearing rotatable with the output shaft in driven relationship. A traction ring is mounted within the housing coaxial with the output shaft, the ring being engaged in traction by an outer spherical surface of the planetary members. Means are provided to axially shift the traction ring relative to the outer spherical surface of the planetary members whereby the output speed of the transmission may be varied. A power take-off shaft may be disposed within the output shaft, one end of the PTO shaft being coupled to the end of the input shaft.

An advantage of the foregoing construction is that the length of the rolling contact per output revolution increases in direct proportion to the input/output rato, or, put in another way, the tangential force at the contact point remains substantially constant regardless of the output torque. This, along with other advantages, allows maximum output torque with minimum amount of normal force on the contacts. This in turn allows the use of lighter weight components and greatly increases the fatigue life of those components.

Another advantage, of this invention, is in the shape of the contact area. Since, as shown above, the tangential force and normal force remain substantially constant, regardless of output torque, and since the radius of the spherical surface of the planetary members, at the contact point, is approximately the radius of the surface of the traction ring, at the contact point, the traction contact geometric shape is one that approaches the ideal, namely a contact shape of zero width. This in turn reduces spin related oil film shear at the traction contact, which allows more of the normal force to be transmitted, through the oil, to tangential force that is parallel to the direction of the rolling contact. This in turn, increases the power capability of this transmission.

The improved traction contact shape of this invention also greatly reduces the different rates of shear of the oil in the contact area. This in turn, increases the efficiency of the design by reducing the heat losses.

Another advantage of this design is the capability of having two output shafts, one rotating within the other at different speeds. Since one shaft is, in effect, a direct power shaft running at constant speed and the second shaft rotates about the first shaft at variable speeds, differential mechanisms, such as planetary differential, could be coupled directly to this transission in order to control output speeds of high horsepower prime movers.

The foregoing features will be more fully understood after a consideration of the following detailed description taken in conjunction with the accompanying drawings.

BRIEF DESCRIPTION OF DRAWINGS

FIG. 5 is an illustration of a modification having input and output shafts extending to the same side.

DETAILED DESCRIPTION

Figure 1:
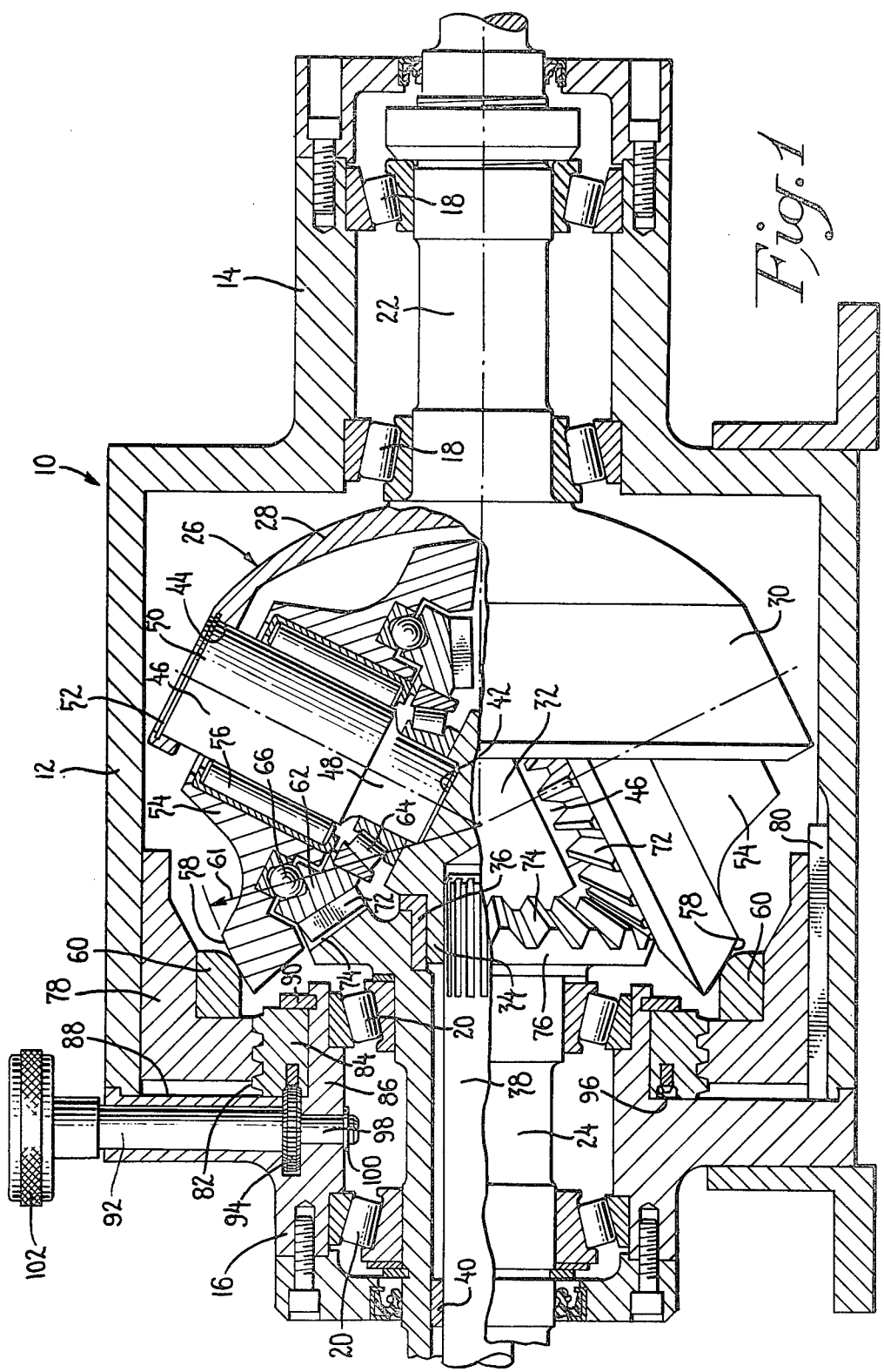
FIG. 1 is a cross-sectional view through the preferred embodiment of a transmission embodying the features of the present invention.
Figure 4:
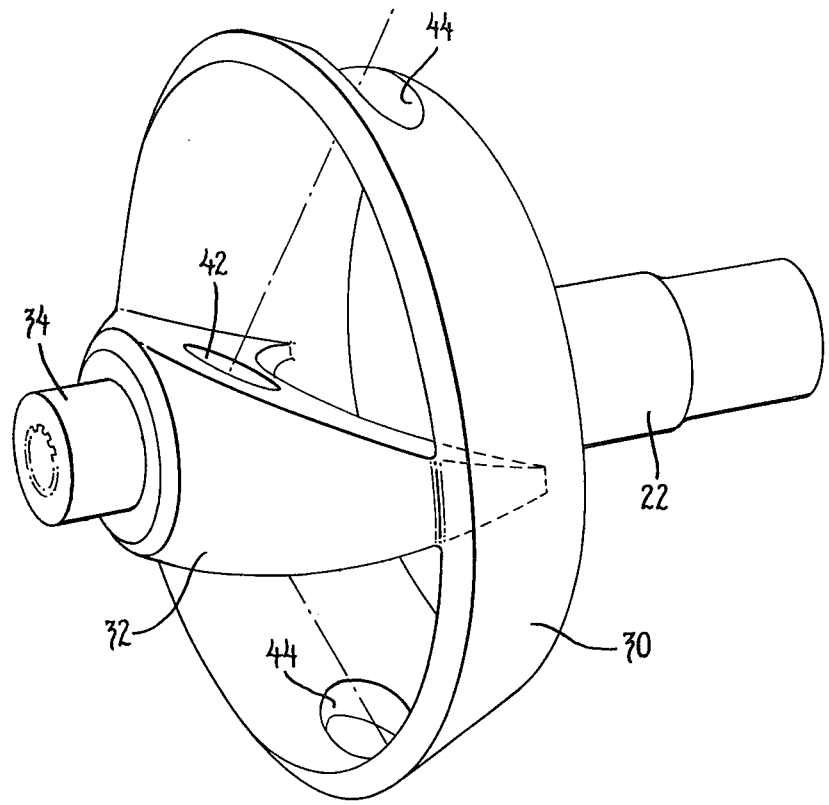
FIG. 4 is a perspective view illustrating the input carrier.

Referring first to FIG. 1 a housing is indicated generally at 10, the housing including a principal portion 12 and right and left outwardly extending bearing portions 14, 16, respectively. Right and left pairs of tapered roller bearings 18, 20, respectively, rotatably support input and output shafts 22, 24 in coaxial alignment. An input carrier indicated generally at 26 is on the inner end of the input shaft 22. In the preferred embodiment illustrated the input carrier is formed integrally with the input shaft 22 and the exterior portion of the input shaft 22 provided with a splined end portion (not illustrated) to which a drive shaft may be connected. However, these parts may be made as individual components. The input carrier has a cup shaped portion 28 and conical portion 30. The input carrier is further provided with a diametrically extending spider 32. This spider is generally triangular in cross section FIG. 1) and is provided with a sleeve extension 34 coaxial with the input shaft 22. The exterior surface of the sleeve portion 34 is supported by a bushing 36, and the interior portion is splined and receives one end of a direct power output shaft 38 the other end of which is supported by a bushing 40 supported within the controllable output shaft 24. As can be seen from FIGS. 1 and 4, the spider 32 is provided with annular recesses 42, the recesses being coaxial with cylindrical holes 44 in the conical portion 30.

A pair of pins are rotatably supported by the carrier, a reduced end portion 48 of each of the pins being received within the annular recess 42, and the other end 50 being received within the hole 44. The pins 46 are held in place by a snap ring 52. The recesses and holes 42, 44 are so located that the axes of the pins 46 lie in a common plane with the axis of the input shaft 22, the axis of each of the pins 46 being preferably disposed at an angle of 62°-63° with respect to the axis of the input shaft 22. A pair of planetry members 54 are rotatably supported on the pins 46 by roller bearings 56. The members 54 are provided with a spherical traction surface 58, which traction surface is designed to engage a traction ring 60. The design of the parts is such that the largest of the traction surface 58 is approximately the same as the internal diameter of the traction ring 60. As can be seen from FIG. 1 the radius 61 of the spherical surface is greater than the radius of the ring 60, the centerpoint of the spherical surface being at the intersection of the centerline of the pins and the axis of the input shaft when the parts are disposed in the position illustrated in FIG. 1.

Figure 3:
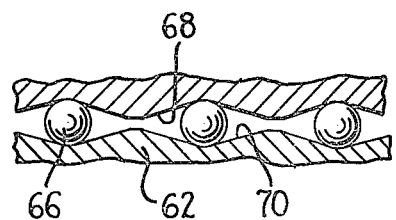
FIG. 3 is a section taken along the line 3—3 in FIG. 2.

Miter gears 62 are journaled on tapered roller bearings 64 which are in turn supported by the reduced end portions 48 of the pins 46. The gears 62 are maintained in driving relationship with the planetary cones 54 by balls 66 which are disposed in ramped tracks between cooperating surfaces of the gears 62 and members 54, the ramps in the members being indicated at 68 in FIG. 3, and the ramps on the gear being indicated at 70. The teeth 72 on the gears 62 are in driving engagement with the gear teeth 74 on a sun gear 76 carried by the inner end of the controllable output shaft 24. While the gear 76 is shown integral with the shaft 24, it should be appreciated that it could be made separate from the output shaft 24. Similarly, rollers may be utilized instead of balls 66.

Means are provided to axially shift the traction ring 60. Thus, the traction ring 60 is carried by a support 78 which is held from rotation in the housing 12 by key 80 or splines. The support is provided with an inner circular portion provided with acme threads 82 which engage corresponding threads on a rotatable member 84 joiurnaled for rotation on an inwardly extending tubular portion 86 of the bearing portion 16. One side of the rotatable member abuts against a wall 88 and the other side is held in place by a snap ring 90. A shaft 92 is received within a radially extending cylindrical recess formed in the portion 16, one end portion of the shaft 92 carrying a spur gear 94 which engages a rack within a annular channel 96 on one side of the rotatable member 84. A reduced end portion 98 of the shaft 92 is held in place by a snap ring 100. The upper end of the shaft 92 is provided with means 102 to rotate shaft, the means illustrated being a knurled knob which can be manually turned. As the knob 102 is turned the gear 94 will in turn be rotated causing rotational movement of the rotatable member 84 about the axis of the output shaft 24. As member 84 rotates in one direction it will advance the ring towards the input carrier 26, and as it is rotated in the other direction it will advance the ring 60 away from the input carrier. While a manually operated knob 102 is illustrated, it should be appreciated that the shaft 92 can be rotated by other means such as a servo mechanism which is responsive to conditions of the mechanism in which the variable speed transmission is utilized.

In the design illustrated in FIGS. 1 through 4 the input and output shafts are disposed on opposite sides of the housing 10. In the design illustrated in FIG. 5 both the input and output shafts are disposed on the same side of the housing. Thus, the input shaft 122 is supported for rotational movement within the output shaft 124. The input carrier 126 is supported by the inner end of the input shaft 122 and is of substantially the same construction illustrated in FIGS. 1 and 4. The miter gears 162 which are in driving engagement with the planetary cones 154 in turn drive the sun gear 176 carried on one end of the output shaft 124. The shaft 192 which is used to rotate the rotatable member 184 and advance the ring 160 is held within the cylindrical recess by a set screw 200.

In operation, as the input carrier 26 rotates about the transmission center line, the planetary members 54 roll onthe inside diameter of the drive ring 160. the tangential force is transmitted by the viscous drag of an oil film between the traction ring and planetary members. This oil film prevents metal to metal contact. In accordance with known principles, a special traction drive oil may be utilized. Normal contact pressure between the ring and planetary members is provided by the series of balls 66 and ramps 68, 70 machined in the members 54 and the gears 62 and varies with torque to prevent slip between the ring and planetary members. The output torque is transmitted from the planetary members through the balls 66 into the gears 62. These gears mesh with the sun gear 176 which is fixed to the output shaft 124 and which rotates in the opposite direction to the input shaft.

Figure 2:
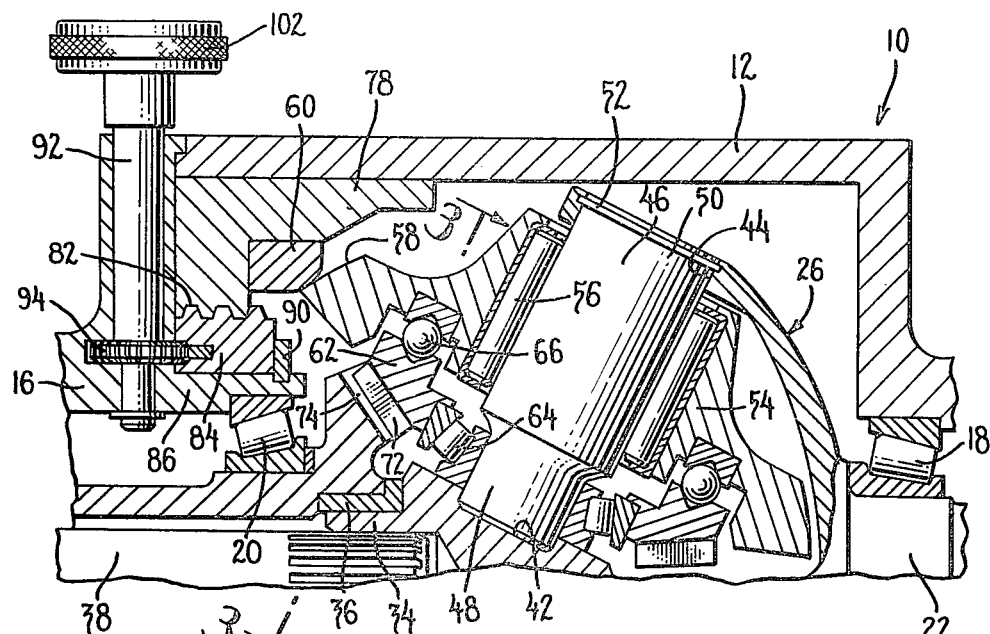
FIG. 2 is a fragmentary view of the structure shown in FIG. 1 illustrating the relationship of the parts when in a differing speed ratio.

As the rotatable member 184 is rotated, it causes the ring support 78 and traction ring 60 to change the surface contact diameter of the planetary members which results in a change of speed ratio. The highest speed ratio change is illustrated in FIG. 2, and if the diameter of the contact surface of the member 54 is the same as the traction ring diameter, an infinite speed reduction will be achieved. Stated in another way, the output speed will be zero. A smaller speed reduction is illustrated in FIG 1. As can be observed from a comparison of FIGS. 1 and 2, the planetary members 54 shift axially with respect to the pins 46 as the output speed ratio is varied. It should also be observed that there is more rolling contact and, therefore, greater surface contact between the planetary members and the ring when in the position illustrated in FIG. 2 and this permits a greater torque to be transmitted at reduced output speeds.

The traction surfaces are only used on the high surface speed, load torque input portion of the transmission. Gears 62 and 76 are used on the high torque output side of the transmission.

By utilizing an angle of 62°-63° it is possible to achieve a maximum cone diameter equal to the internal diameter of the traction ring. Thus, a speed range is obtainable from approximately a 6:1 ratio to an infinite ratio which results in no rotation of the output shaft. This could eliminate the need for a clutch within a drive line employing the transmission of this invention. While a 62°-63° angle is preferred, almost the same benefits can be achieved by utilizing an angle of anywhere from 60 to 65 degrees.

I claim:

1. A high torque infinitely variable traction drive comprising:
   a transmission housing;
   coaxial input and output shafts having end portions extending within said housing;
   an input carrier rotatable with the input shaft;
   a plurality of pins, opposite end portions of the pins being carried by the input carrier;
   a plurality of planetary members carried by the plurality of pins, each of the planetary members having a traction surface;
   a plurality of gears driveable by the plurality of planetary members;
   gearing rotatable with the output shaft in driven relationship with the plurality of gears;
   a traction ring disposed within the housing and coaxial with the input shaft and engaged by the traction surface of the planetary members, the diameter of the traction surface being approximately the same as the internal diameter of the traction ring; and
   means to axially shift the traction ring.

2. The high torque infinitely variable traction drive set forth in claim 1 in which the input shaft is journaled for rotation within the output shaft.

3. The high torque infinitely variable traction drive set forth in claim 1 in which the input carrier is a cup shaped member provided with a spider which extends across the open end of said cup.

4. The high torque infinitely variable traction drive set forth in claim 3 wherein a portion of said spider is rotatably supported by one end of the output shaft.

5. The high torque infinitely variable traction drive set forth in claim 4 wherein said portion of the spider is coupled to one end of a power take-off shaft, said power take-off shaft being disposed coaxially within the output shaft.

6. The high torque infinitely variable traction drive set forth in claim 3 wherein the center line of the pins lie in a common plane passing through the axis of rotation of the input shaft, an end portion of each of the pins being supported by the cup shaped portion of the input carrier, and the other end portion of each of the pins being supported by the spider portion of the input carrier.

7. The high torque infinitely variable traction drive set forth in claim 6 wherein the center line of each of the pins lies at an angle of preferably 60°-65° with respect to the axis of the input shaft.

8. The high torque infinitely variable traction drive set forth in claim 6 wherein the center line of the pins is disposed at an angle of preferably 62° to 63° with respect to the axis of the input shaft.

9. The high torque infinitely variable traction drive set forth in claim 6 wherein the planetary members carried by the pins are provided with a spherical traction surface.

10. The high torque infinitely variable traction drive set forth in claim 6 wherein the diameter of the planetary members ar substantially the same as the diameter of the traction ring.

11. The high torque infinitely variable traction drive set forth in claim 1 wherein said planetary members are axially shiftable with respect to said pins, and further characterized by the provision of driving balls disposed between each of said planetary members and an associated gear, said driving balls interengaging ramps on each of said planetary members and said gears to maintain the planetary members in driving relationship with said gears.

12. A high torque infinitely variable traction drive transmission comprising:
   a transmission housing;
   coaxial input and output shafts, having end portions disposed within said housing;
   an input carrier mounted on an end portion of the input shaft and rotatable therewith, the input carrier including a cup shaped portion the open end of which faces the output shaft, and a spider extending across the open end;
   a pair of pins, one end portion of each of the pins being carried by the cup shaped portion, and the other end portion being carried by the spider;
   a pair of planetary members carried by the pins; each of the planetary members having a traction surface portion;
   a pair of gears, each of which is driveable by an associated planetary member;
   gearing rotatable with the output shaft and in driven relationship with said pair of gears;
   a traction ring disposed within the housing and coaxial with the input shaft and engaged by the traction surface of the planetary members, the diameter of the traction ring being approximately the same as the diameter of the traction surface of the planetary members; and
   means to axially shift the traction ring whereby the output ratio of the transmission may be varied.

13. The high torque infinitely variable traction drive transmission set forth in claim 12 in which the output shaft is of tubular construction, and further characterized by the provision of a power take-off shaft mounted within and coaxial with the output shaft, one end of the power take-off shaft being interconnected with said spider to be driven thereby whereby the power take-off shaft has the same rotational speed as the input shaft.

14. The high torque infinitely variable traction drive transmission set forth in claim 13 wherein the spider is provided with a tubular extension coaxial with the output shaft, the exterior surface of the tubular portion being rotatably supported by a bearing disposed within one end of the output shaft, and the interior portion being provided with a spline, said spline engaging a spline end of the power take-off shaft in driving relationship.

15. The high torque infinitely variable traction drive transmission set forth in claim 12 wherein the center line of the pins and the axis of the the input shaft lie in a common plane, the centerline of the pins being disposed at an angle of preferably 60° to 65° with respect to the axis of the input shaft.

16. The high torque infinitely variable traction drive transmission set forth in claim 15 wherein the traction surface portion of the planetary members is generally spherical.

17. The high torque infinitely variable traction drive transmission set forth in claim 16 wherein the radius of the sphere is greater than the radius of the ring.

18. The high torque infinitely variable traction drive transmission set forth in claim 17 wherein the center of the spherical surface lies at the intersection of the centerline of the pins and the axis of the input shaft when the traction ring is disposed in one position of adjustment.

19. The high torque infinitely variable traction drive transmission set forth in claim 12 wherein the spider is provided with an extension journaled within one end of the output shaft.

20. The high torque infinitely variable traction drive transmission set forth in claim 12 wherein each of the pins is provided with a first end portion received within a blind recss in the spider, the other end of each of the pins being received within a hole in the cup shaped member, the pins being held in place by a snap ring which engages said other end of the pins and the cup shaped portion about the hole.

21. The high torque infinitely variable traction drive transmission set forth in claim 12 wherein the planetary members are rotatably journaled about the pins.

22. The high torque infinitely variable traction drive transmission set forth in claim 12 wherein gears are rotatably journaled about said pins.

23. The high torque infinitely variable traction drive transmission set forth in claim 22 wherein the planetary members are journaled for rotational and sliding movement with respect to said pins, the planetary members being maintained in driving contact with the gears by driving balls disposed between each of the planetary members and an associated gear, the driving balls engaging ramps on each of said planetary members and said gears.

* * * * *